United States Patent [19]

Pientka et al.

[11] Patent Number: 5,789,888
[45] Date of Patent: Aug. 4, 1998

[54] ARRANGEMENT FOR OPERATING A WIPER

[75] Inventors: Rainer Pientka, Achern; Hans Meier, Ottersweier; Henry Blitzke, Buehl, all of Germany

[73] Assignee: Robert Bosch GmbH, Stuttgart, Germany

[21] Appl. No.: 652,649

[22] Filed: May 28, 1996

[30] Foreign Application Priority Data

May 27, 1995 [DE] Germany ............... 195 19 500.0

[51] Int. Cl.$^6$ .................................................. B60S 1/08
[52] U.S. Cl. .................. 318/483; 318/444; 318/DIG. 2
[58] Field of Search .................................. 318/443, 444, 318/480, 483, DIG. 2; 15/250.001; 307/10.8

[56] References Cited

U.S. PATENT DOCUMENTS

| | | | |
|---|---|---|---|
| 3,786,330 | 1/1974 | Inoue et al. | 318/483 |
| 4,317,073 | 2/1982 | Blaszkowski | 318/483 |
| 4,339,698 | 7/1982 | Kearns | 318/444 |
| 4,476,419 | 10/1984 | Fukatsu et al. | |
| 4,916,374 | 4/1990 | Schierbeek et al. | 318/483 |
| 5,059,877 | 10/1991 | Teder | 318/444 |
| 5,252,898 | 10/1993 | Nolting et al. | |
| 5,319,293 | 6/1994 | Levers | 318/483 |
| 5,453,670 | 9/1995 | Schaefer | |
| 5,694,012 | 12/1997 | Pientka | 318/444 |

FOREIGN PATENT DOCUMENTS

| | | |
|---|---|---|
| 0191638 | 8/1986 | European Pat. Off. |
| 3941905 A1 | 6/1990 | Germany |
| 4112847 A1 | 10/1992 | Germany |
| WO92/18358 | 10/1992 | Germany |
| 63-031849 | 2/1988 | Japan |

*Primary Examiner*—David S. Martin
*Attorney, Agent, or Firm*—Spencer & Frank

[57] ABSTRACT

An arrangement for operating a wiper includes a sensor for detecting a wetting state of a pane and outputting a sensor signal based thereon, an evaluator for receiving the sensor signal from the sensor, and evaluating the sensor signal, and an actuator for actuating the wiper, the actuator being actuated by the evaluator to produce one of a plurality of wiping modes, including a stage II wiping mode for heavy wetting conditions. The evaluator includes an evaluation stage for determining whether a degree of wetting corresponding to a stage II wiping condition occurs after a prolonged wiping break, for example after passing through a tunnel, and a processing stage. If a degree of wetting corresponding to a stage II wiping condition is determined to occur after a prolonged wiping break, the processing stage is actuated by the evaluation stage to cause a change-over to stage II wiping within a shorter time period than in a case where a prolonged wiping break is not present for a comparable degree of wetting.

12 Claims, 1 Drawing Sheet

ARRANGEMENT FOR OPERATING A WIPER

CROSS-REFERENCE TO RELATED APPLICATION

This application claims the priority of German Application No. DE 195 19 500.0-22 filed May 27, 1995, the subject matter of which is hereby incorporated by reference.

The subject matter of this application is also related to the subject matter of a copending application Ser. No. 08/654,069, filed in the U.S. Patent and Trademark Office on May 28, 1996, having the same inventors as the present application, the copending application being Attorney Docket number BOSCH 0211, which copending application claims the benefit of priority of DE 195 19 471.3-22 of May 27, 1995, the subject matter of the copending application, and the associated priority document being hereby incorporated by reference.

BACKGROUND OF THE INVENTION

1. Field of the Invention

The invention relates to the field of wiper control, and more particularly, to front or rear windshield wipers having a sensor device for detecting the wetting state or degree of wetness of the front or rear windshield.

2. Background Information

An arrangement for operating a front or rear windshield wiper includes a sensor device for detecting the wetting state of a front or rear windshield pane, an evaluation device for picking picking up a sensor signal, and an actuation unit for the wiper. The actuation unit can be actuated by the evaluation device to produce a wiping operation or mode. The wiping modes includes a low-speed stage I, and a higher-speed stage II for when a heavy wetting is detected.

With the sensor device, heavy rain or snow can be recognized, and a corresponding stage II wiping mode can be switched on automatically. This takes place, for example, by detecting and storing measured values, or corresponding counting values, during several successive wiping cycles or actions. If a weighted average value of the stored values exceeds a predetermined constant, a corresponding control signal is generated by the evaluation device, and a change-over to stage II takes place via the actuation unit. Normally, such a transition may be perceived by the driver as being welcome, however as described below, it may not be optimal in some situations. Such an arrangement for operating a wiper having a sensor device is disclosed in DE 40 18 903 C2, but the transition to stage II is not explained in any detail therein.

A problem associated with this conventional arrangement may occur after a "wiping break," a period of wiper inactivity which occurs while passing through a tunnel, for example. The problem is that a change-over after the wiping break to stage II wiping may not be as prompt as required with the conventional arrangement.

In the conventional arrangement, under normal circumstances, that is, without any wiping break, and with a comparable degree of wetting, five wiping actions, for example, might occur before stage II would be activated. As a consequence, after a long wiping break, the transition to stage II would disadvantageously take place after several wiping actions because of the small initial counting values.

SUMMARY OF THE INVENTION

In order to solve the above-mentioned problem the present invention provides the following novel features and advantages.

It is an object of the invention to modify and improve on the conventional arrangement of the type described above in such a way that an advantageous transition to the stage II wiping mode or operation is always accomplished in any situation.

In an arrangement according to the invention, an improvement on the conventional type, this object is solved in that the evaluation device is provided with a novel evaluation stage to determine when a degree of wetting that corresponds to a stage II wiping situation occurs after a prolonged wiping break. A decision is made whether or not a degree of wetting corresponding to stage II occurs after a prolonged wiping break and, if this degree of wetting is present after a prolonged wiping break, a processing stage is actuated to effect a change-over to stage II wiping. This occurs within a shorter time than under normal circumstances, where there is no prolonged wiping break, given a comparable degree of wetting.

In the conventional arrangement, five or more wiping actions, for example, might disadvantageously occur before stage II would be activated, even after a long wiping break, because of the small initial counting values. However, with the present invention, the change-over to stage II can advantageously take place immediately, that is, after the first wiping action.

According to the present invention, it is determined with the evaluation stage whether a wetting state due to rain, snow or dirt, for example, which correspond to stage II wiping mode situations, occurs immediately after a prolonged wiping break, e.g., after driving through a tunnel, or whether the wetting state is due, for example, to a normal continuous transition from a lower degree of wetting to the degree of wetting which corresponds to stage II. In the case where a degree of wetting corresponding to stage II occurs after a prolonged break, a processing stage is actuated with which stage II is switched on within a relatively shorter period of time, compared to the normal case of the continuous transition.

This advantageously may increase safety because large amounts of precipitation or dirt, which may occur, for example, when passing a truck in wet snow, can be removed quickly from the windshield pane.

A fast, reliable transition to stage II after a prolonged break and a degree of wetting that corresponds to stage II, is accomplished, for example, by recognizing this degree of wetting during a first wiping action at a speed that corresponds to stage I. Therefore, starting as early as with the second wiping action, stage II wiping can be actuated.

Advantageously, according to one embodiment, the faster and earlier change-over to stage II takes place when the prolonged wiping break amounts to at least 5 seconds.

Advantageously, the arrangement according to the present invention can be realized with little complexity. The evaluation device includes storage locations for measured values sensed during several successive wiping actions. According to the present invention, after a prolonged wiping break, the measured values resulting from degrees of wetting corresponding to stage II are written into the storage locations of these several successive wiping actions. Since, for the change-over to stage II, a weighted average value of the stored values that are present in the storage locations corresponding to the several wiping cycles or actions is compared with a constant value, a change-over to stage II can occur more rapidly with the present invention.

This configuration can be implemented easily, for example, through appropriate program control. Here, it may be provided, for example, that storage locations corresponding to five wiping actions are present.

According to an embodiment of the invention, an arrangement for operating a wiper comprises a sensor for detecting a wetting state of a pane and outputting a sensor signal based thereon; an evaluator for receiving the sensor signal from the sensor, and evaluating the sensor signal; and an actuator for actuating the wiper. The actuator is actuated by the evaluator to produce one of a plurality of wiping operations or modes, including a stage II wiping mode for heavy wetting conditions. The evaluator includes an evaluation stage for determining whether a degree of wetting corresponding to a stage II wiping situation occurs after a prolonged wiping break; and a processing stage, wherein, if a degree of wetting corresponding to a stage II wiping situation is determined to occur after a prolonged wiping break, the processing stage is actuated by the evaluation stage to cause a change-over to stage II wiping within a shorter time period than in a case where a prolonged wiping break is not present for a comparable degree of wetting.

BRIEF DESCRIPTION OF THE DRAWINGS

The above and other features of the invention will become apparent from the following detailed description taken with the drawings in which.

DETAILED DESCRIPTION OF THE PREFERRED EMBODIMENT(S)

The invention will now be described in more detail by example with reference to the exemplary embodiment shown in the Figures. It should be kept in mind that the following described embodiment is only presented by way of example and should not be construed as limiting the inventive concept to any particular physical configuration. In the following description, familiarity with the discussion presented above will be assumed.

Figure 1:
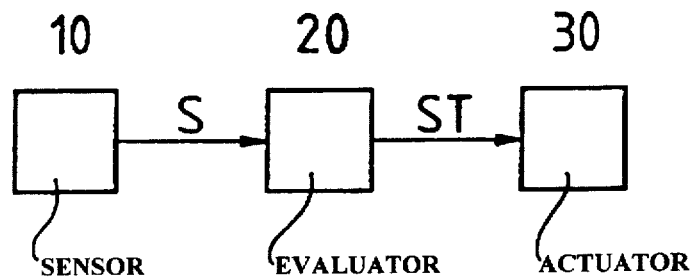
FIG. 1 is a functional block diagram of an arrangement for the operation of a wiper according to the present invention.

FIG. 1 shows an arrangement for operating a wiper, e.g., a windshield wiper (not shown), having a sensor 10 which provides a sensor signal S to an evaluator 20. If a reference value is exceeded, evaluator 20 generates a control signal ST corresponding to sensor signal S. Through control signal ST, a suitable wiping operation or mode, e.g., stage I or stage II, can be activated with an actuation unit 30.

By way of explanation, if sensor 10 is an optical sensor, sensor signal S is reduced in amplitude if the windshield pane is wetted with water drops or snow, or dirt is present, for example. A wiping mode corresponding to the degree of wetting can automatically be actuated on the basis of the sensor signal. Wiping modes may include, for example, a direct mode with occasional wiping actions, an intermittent mode with adjustable wiping intervals, a stage I wiping mode for less heavy precipitation, or a stage II wiping mode for higher degrees of wetting.

Normally, a transition from a stage I to a stage II wiping mode does not take place abruptly when the associated degree of wetting for stage II is reached, since this could possibly lead to irregular wiping actions. Instead, the transition from stage I to stage II only occurs after an analysis of several wetting events during several wiping actions.

Therefore, for evaluating when to transition from stage I to stage II, evaluator 20 is provided, for example, with storage locations for measured values, or corresponding counting values, of the last five wiping actions. From the storage values stored in these storage locations, an optionally weighted average value is formed, which may be compared to a constant defining a change-over threshold value. Based on the comparison, stage I wiping is either maintained, or a change-over to stage II wiping occurs. In this scheme, the values in the storage locations are continually updated.

According to the present invention, if a degree of wetting suddenly occurs which corresponds to a stage II wiping situation, for example, as would occur after a longer wiping break when driving through a tunnel, or which might occur due to the additional moisture or dirt put on the windshield pane when passing a truck, the corresponding measured value (or counting value) during a wiping action is written not only into the storage location allocated to this wiping action, but also into storage locations of the preceding wiping actions.

The average value of these stored values is then generated in the manner described above and compared with the constant value defining the change-over threshold.

Figure 2:
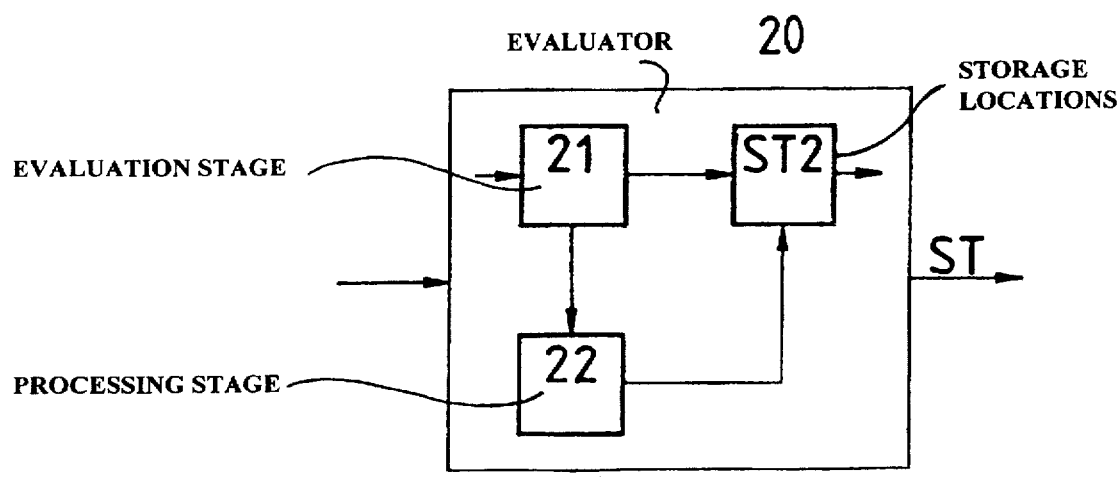
FIG. 2 is a more detailed configuration of the evaluation device shown in FIG. 1.

The evaluation as to whether a prolonged break of at least 5 seconds, for example, is present and the corresponding degree of wetting has occurred, takes place through an evaluation stage 21, as shown in FIG. 2, included in the exemplary evaluator 20 of FIG. 1.

When evaluation stage 21 determines the above described conditions, it actuates a processing stage 22 which causes the measured wetting values to be entered into the storage positions (ST2) during the first wiping action that occurs after the wiping break.

The comparison of the average value with the constant change-over threshold value then takes place as in the normal state, that is, the normal transition from stage I to stage II. If the wetting value measured after the wiping break is associated with a stage II situation, since this wetting value is stored in each of the storage positions ST2, the calculated average will be larger than otherwise and, therefore, a change-over to stage II wiping action will be signalled upon comparison with the change-over threshold value.

Particularly in critical situations, a fast transition to the wiping mode of stage II is advantageously accomplished in the manner described. The present invention thus achieves an optimization of adaptation to the outside conditions and the safety of the driver of the vehicle is thereby improved.

It will be apparent to one of ordinary skill in the art that the manner of making and using the claimed invention has been adequately disclosed in the above-written description of the preferred embodiment taken together with the drawings.

It will be understood that the above description of the preferred embodiment of the present invention is susceptible to various modifications, changes, and adaptations, and the same are intended to be comprehended within the meaning and range of equivalents of the appended claims.

What is claimed is:

1. An arrangement for operating a wiper, comprising:
   a sensor for detecting a wetting state of a pane and outputting a sensor signal based thereon;
   an evaluator for receiving the sensor signal from the sensor, and evaluating the sensor signal; and
   an actuator for actuating the wiper, the actuator being actuated by the evaluator to produce one of a plurality of wiping modes, the wiping modes including a predetermined wiping mode for a heaving wetting state, wherein the evaluator includes:

evaluation means for determining whether the heavy wetting state occurs after a wiping breaks, and processing means, actuated by the evaluation means, for causing the actuator to change-over to the predetermined wiping mode within a first time period if the heaving wetting stage occurs after a wiping break, and wherein the evaluator causes the actuator to change-over to the predetermined wiping mode in a second time period if the heavy wetting state is not preceded by a wiping break, the second time period being longer than the first time period.

2. An arrangement according to claim 1, wherein the wiping modes additionally include a further wiping mode having a wiping speed that is slower than that of the predetermined wiping mode, and wherein, if the heavy wetting stage occurs after a wiping break, the evaluator causes the actuator to produce a first wiping action in the further wiping mode during the first time period and to then change-over to the predetermined mode starting with a second wiping action.

3. An arrangement according to claim 2, wherein the wiping break has a duration of at least 5 seconds.

4. An arrangement according to claim 3, wherein the evaluator further comprises storage means having storage locations for storing measured wetness values for several successive wiping actions;

wherein, after a wiping break and in the presence of the heavy wetting state, wetness values corresponding to the heavy wetting state are written into storage locations for the several successive wiping actions; and wherein for the change-over to the predetermined wiping mode, a weighted average value of the stored wetness values in the storage locations is calculated and compared with a threshold value.

5. An arrangement according to claim 4, wherein the several successive wiping actions comprise five wiping actions.

6. An arrangement according to claim 1, wherein the wiping break has a duration of at least 5 seconds.

7. An arrangement according to claim 6, wherein the evaluator further comprises storage means having storage locations for storing measured wetness values for several successive wiping actions;

wherein, after a wiping break and in the presence of the heavy wetting state, wetness values corresponding to the heavy wetting state are written into the storage locations of the several successive wiping actions; and wherein for the change-over to the predetermined wiping mode, a weighted average value of the stored wetness values in the storage locations is calculated and compared with a threshold value.

8. An arrangement according to claim 7, wherein the several successive wiping actions comprise five wiping actions.

9. An arrangement according to claim 1, wherein the evaluator further comprises storage means having storage locations for storing measured wetness values for several successive wiping actions;

wherein, after a wiping break and in the presence of the heavy wetting state, wetness values corresponding to the heavy wetting state are written into the storage locations of the several successive wiping actions; and wherein for the change-over to the predetermined wiping mode, a weighted average value of the stored wetness values in the storage locations is calculated and compared with a threshold value.

10. An arrangement according to claim 9, wherein the several successive wiping actions comprise five wiping actions.

11. In an arrangement for controlling a wiper, a method of changing over from a first wiping mode associated with a first adverse visibility condition of a windshield to a second wiping mode associated with a second adverse visibility condition of the windshield when an adverse visibility condition is encountered after a break in wiping, the second adverse visibility condition being more severe than the first adverse visibility condition, comprising:

detecting the break in wiping;

performing a first wiping action in the first wiping mode;

detecting, in the first wiping action in the first wiping mode, the adverse visibility condition of the windshield; and if the adverse visibility condition of the windshield is detected to be the second adverse visibility condition, immediately switching to the second wiping mode for a next wiping action, wherein the step of immediately switching comprises storing a detected environmental value that is indicative of the second adverse visibility condition at a plurality of memory locations, averaging the contents of the plurality of memory locations, and comparing the average to a reference value.

12. The method according to claim 11, wherein the break in wiping has a duration of at least 5 seconds.

* * * * *